United States Patent
Brahmbhatt

(10) Patent No.: US 7,300,498 B2
(45) Date of Patent: Nov. 27, 2007

(54) REGENERATION OF ADSORPTION BEDS USING HEATED NITROGEN

(75) Inventor: Sudhir R. Brahmbhatt, Glencoe, MO (US)

(73) Assignee: American Air Liquide, Inc., Fremont, CA (US)

( * ) Notice: Subject to any disclaimer, the term of this patent is extended or adjusted under 35 U.S.C. 154(b) by 461 days.

(21) Appl. No.: 11/022,616

(22) Filed: Dec. 27, 2004

(65) Prior Publication Data

US 2006/0137523 A1    Jun. 29, 2006

(51) Int. Cl.
*B01D 53/04* (2006.01)

(52) U.S. Cl. ............................. 95/115; 95/148; 96/122; 96/126; 96/130

(58) Field of Classification Search .................. 95/114, 95/115, 148; 96/122, 126, 130, 143, 146
See application file for complete search history.

(56) References Cited

U.S. PATENT DOCUMENTS

| | | | | |
|---|---|---|---|---|
| 4,092,133 A | * | 5/1978 | Kamiya et al. ............... | 95/115 |
| 4,329,158 A | * | 5/1982 | Sircar ............................ | 95/26 |
| 5,152,812 A | * | 10/1992 | Kovach .......................... | 95/41 |
| 5,154,735 A | | 10/1992 | Dinsmore | |
| 5,203,889 A | * | 4/1993 | Brown ......................... | 96/115 |
| 5,367,882 A | | 11/1994 | Lievens | |
| 5,614,000 A | * | 3/1997 | Kalbassi et al. ............... | 95/96 |
| 5,658,369 A | * | 8/1997 | Kusay ........................... | 95/41 |
| 5,702,587 A | | 12/1997 | Clifford | |
| 5,759,236 A | * | 6/1998 | Bruck et al. .................. | 95/41 |
| 5,779,768 A | * | 7/1998 | Anand et al. ................. | 95/99 |
| 5,904,832 A | | 5/1999 | Clifford | |
| 5,935,525 A | | 8/1999 | Lincoln | |
| 6,572,681 B1 | * | 6/2003 | Golden et al. ................ | 95/122 |
| 6,984,258 B2 | * | 1/2006 | Niclout et al. ................ | 95/115 |

FOREIGN PATENT DOCUMENTS

JP    58-008729 A    *    1/1983

OTHER PUBLICATIONS

Solvent Recovery Adsorption with Activated Carbon Inert Gas Regeneration, DEC Impianti (May 2004).

* cited by examiner

*Primary Examiner*—Frank M. Lawrence
(74) *Attorney, Agent, or Firm*—Christopher J. Cronin; William H. Eilberg

(57) ABSTRACT

A system and method for removal of solvents, or other materials, from an exhaust stream, uses an active adsorption bed and a bed that is periodically regenerated. Electrically heated nitrogen may be used to regenerate the beds. A portion of the exhaust stream to be cleaned is diverted to a heat exchanger, so as to pre-heat the nitrogen used for regeneration. Liquid nitrogen, preferably from the same source as that used to provide gas for regeneration, is directed to the active bed, lowering its temperature and increasing its efficiency. The invention avoids the need for the use of steam to heat the nitrogen, and provides a system that is more efficient than those known in the prior art.

16 Claims, 2 Drawing Sheets

REGENERATION OF ADSORPTION BEDS USING HEATED NITROGEN

BACKGROUND OF THE INVENTION

The present invention relates to the field of treatment of fluids, and, in particular, relates to the regeneration of adsorption systems used to remove organic solvents from gas streams.

Although the present invention is described with respect to its use in the printing industry, the invention can be used in other fields, and is not limited to any one application.

The printing industry uses organic solvents that are combined with printing inks. Solvents such as toluene are added to the ink to make the ink flow more readily. After the ink has been deposited on a sheet of paper in the printing operation, much of the solvent evaporates. Because solvents such as toluene are both carcinogenic and explosive, it is necessary to dispose of them properly, and not to allow them to be discharged into the ambient air.

In a typical installation, the toluene released from printing ink is conveyed, with a gas stream, to an adsorption bed made of activated charcoal. The activated charcoal bed traps the toluene, while allowing other gases to pass through. After a period of continuous use, the available sites in the charcoal bed eventually become filled by the trapped toluene, and the adsorption bed loses its effectiveness. To restore the adsorption bed to its original condition, one must remove the trapped toluene, in a process known as regeneration. Regeneration is typically performed by heating the bed so as to drive off the toluene or similar solvents.

In the prior art, it is known to regenerate a charcoal bed with the use of steam. FIG. 1 shows a typical system made according to the prior art. The system includes two activated charcoal beds. Bed 1 is shown as "active", and bed 3 is shown as being regenerated. The active bed is the one that receives the solvent-containing exhaust, carried by conduit 11, from the printing process, or other process, and its output comprises a cleaned gas, carried by conduit 13, that is substantially free of the solvent being removed. While one bed is active, the other bed is being regenerated. Periodically, the beds are switched, so that the bed that was previously being regenerated becomes the active bed, and vice versa. The dotted line extension of conduit 11 indicates that when the beds are switched, the exhaust gas from the printing or other process goes into bed 3 (which becomes the active bed) instead of bed 1.

The bed 3 being regenerated receives steam that comes from boiler 5. In the prior art, natural gas is typically used as the fuel for the boiler. The hot steam, carried by conduit 15, is passed through the bed 3 being regenerated, and the heat from the steam drives the toluene (or other material trapped by the adsorption bed) out of the bed. The fluid stream exiting the bed being regenerated is then cooled, in heat exchanger 7, so as to liquefy the stream. This fluid includes toluene, and water which has condensed from the steam. The resulting water-toluene mixture passes to separator 9. Because water and toluene do not mix, and water is more dense, the water collects on the bottom and the toluene sits on top. One can then easily separate the toluene from the water, such as by decanting. The remaining water is substantially free of toluene, and can be stripped of volatile organic compounds (VOC) before being conveyed to a suitable conduit for waste water discharge.

The dotted line extension of conduit 15 shows that when the beds are switched, the steam is directed into bed 1, which becomes the bed being regenerated.

A major disadvantage of the arrangement of FIG. 1 is that the system requires a large amount of natural gas, or coal, or other fuel, to heat the water to make the steam. As the price of natural gas rises, it becomes prohibitively expensive to practice the above-described solvent treatment process.

The present invention solves the above-described problem by providing a method and system which uses heated nitrogen for regeneration of an adsorption medium, thereby avoiding the use of steam. The present invention includes means for optimizing the use of energy, such that the process is carried out with substantially improved efficiency, as compared with systems of the prior art.

SUMMARY OF THE INVENTION

The present invention comprises an improvement to a prior art process for treatment of an exhaust fluid stream. The fluid stream, which is usually a gas containing a solvent to be removed, such as toluene, is passed through an adsorption bed, which is normally a bed of activated charcoal. At the same time, the solvent trapped in a similar adsorption bed is regenerated, by passing a stream of heated nitrogen gas through the bed, so as to drive out the solvent. The solvent is then recovered, and the nitrogen re-used. Periodically, the identities of the adsorption beds are reversed, so the bed that was active becomes the bed that is being regenerated, and vice versa.

In the present invention, the nitrogen (or other inert gas) is heated by an electric heater. Alternatively, the nitrogen can be heated by virtually any other heating means that is present in the facility housing the adsorption system. For example, an existing hot water line could be connected to ducts leading to a heat exchanger for heating the nitrogen.

The present invention may also include the step of directing liquid nitrogen to the active adsorption bed. Cooling the bed increases its capacity, and reduces the frequency with which the bed must be regenerated. The liquid nitrogen used to cool the bed and the gaseous nitrogen used for regeneration preferably come from a common source.

The present invention also includes the step of diverting a portion of the incoming exhaust gas stream to a heat exchanger through which the nitrogen gas flows, on its way to the heater and to the regenerating bed. Heat from the incoming exhaust gas therefore pre-heats the nitrogen, thus taking advantage of the heat present in the exhaust stream, and reducing the burden on the nitrogen heater. The diverted portion of the exhaust stream is then returned, in a closed loop, to its starting point, so that it too can pass through the active adsorption bed to be purified.

The invention also includes a system for performing all of the above-described method steps.

The present invention therefore has the primary object of providing a system and method for removing toluene, or other solvents, from a fluid stream.

The invention has the further object of providing a method and system which avoids the need for the use of steam, in regenerating an adsorption bed used to remove a solvent from a gas stream.

The invention has the further object of providing a method and system which improves the efficiency of an adsorption process.

The invention has the further object of providing a method and system which uses heated nitrogen gas to regenerate an adsorption bed, and wherein the incoming gas stream is used to pre-heat the nitrogen gas.

The invention has the further object of providing a method and system as described above, wherein the nitrogen gas may be heated by electric means, or by virtually any other source of heat available in a facility.

The invention has the further object of enhancing the efficiency of an exhaust treatment process, by using nitrogen, taken from the same source, both to enhance the adsorption process and to regenerate an adsorption bed.

The reader skilled in the art will recognize other objects and advantages of the invention, from a reading of the following brief description of the drawings, the detailed description of the invention, and the appended claims.

DETAILED DESCRIPTION OF THE INVENTION

Figure 1:
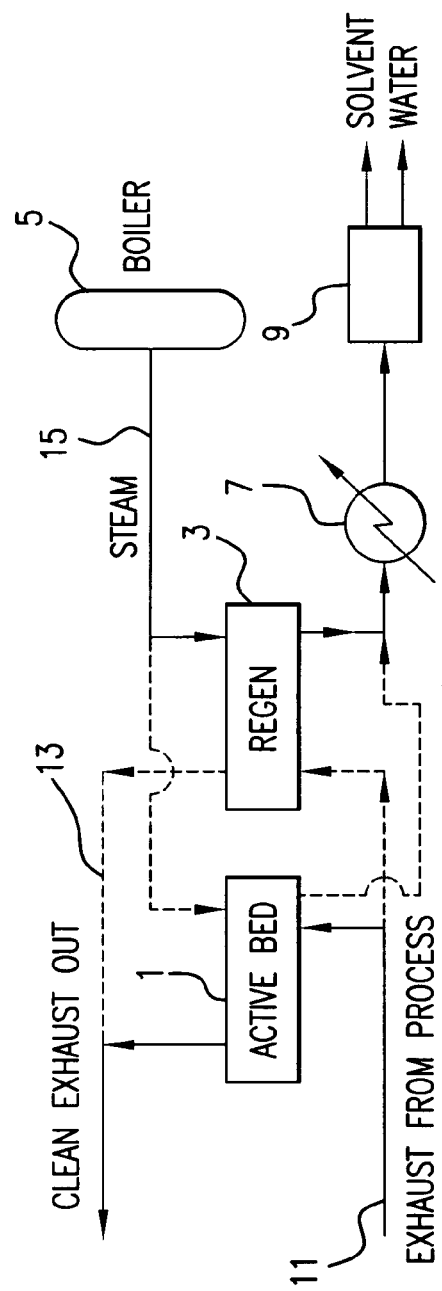
FIG. 1 provides a schematic diagram of a system of the prior art, in which an adsorption bed is regenerated by steam.

The present invention comprises a system and method for removal of a solvent from a gas stream, the method being based on adsorption. As in the prior art, the present invention employs at least one active adsorption bed and at least one adsorption bed that is being regenerated. The identities of the adsorption beds are periodically reversed, so that a bed that is active becomes a bed that is regenerated, and vice versa. In the drawings accompanying this specification, dotted lines are used to indicate connections made when the identities of the beds are reversed.

Figure 2:
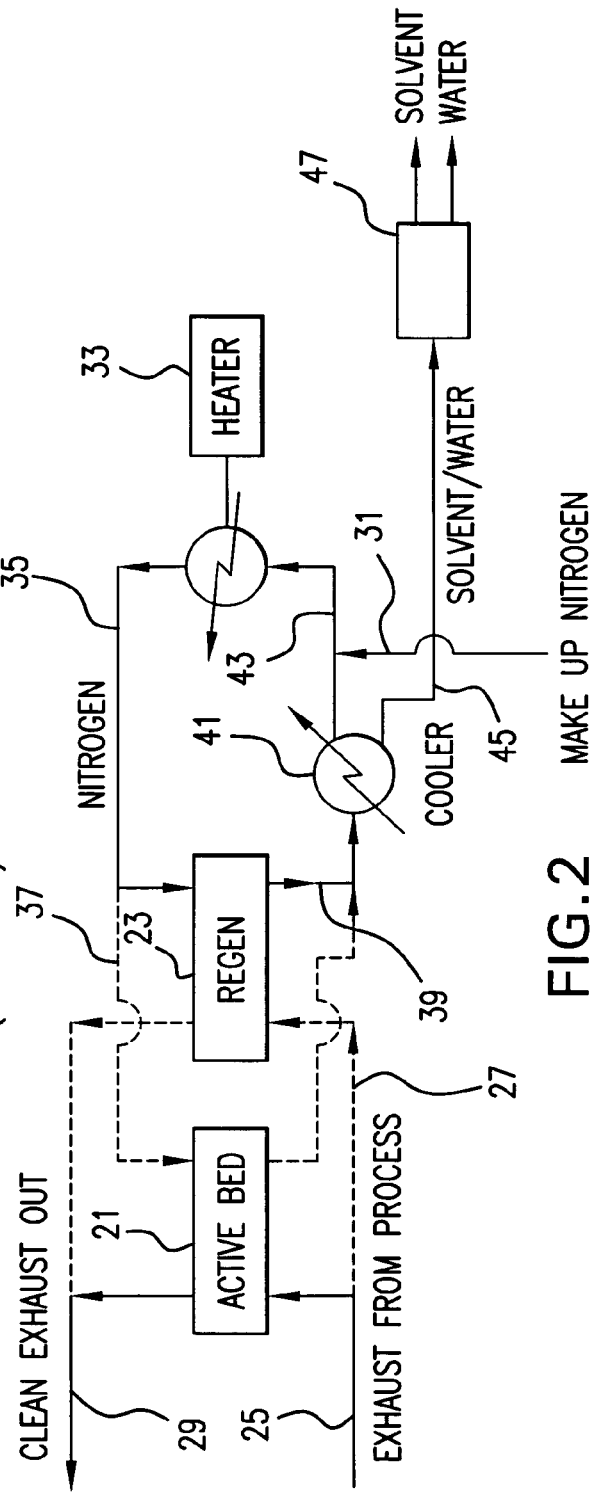
FIG. 2 provides a schematic diagram of one embodiment of the present invention, in which an adsorption bed is regenerated by heated nitrogen.

FIG. 2 shows one preferred embodiment of the present invention. The system includes at least one active adsorption bed 21 and at least one adsorption bed 23 that is being regenerated. In FIG. 2, bed 21 is currently active, and the exhaust gas, from the printing process, or other process, delivered through conduit 25, is directed into bed 21. Note that the term "exhaust gas" is used because this gas is the exhaust of the process, though it is the input to the present system.

When the beds are switched, the exhaust gas from the printing or other process would be directed into bed 23, as indicated by the dotted line 27, because bed 23 would then be the active bed. Purified exhaust gas exits the active bed through conduit 29, which is connected to bed 23 when bed 23 becomes active.

Instead of steam, the system of FIG. 2 uses gaseous nitrogen, delivered through conduit 31. This nitrogen passes through a heat exchanger which receives heat from heater 33. Heater 33 may be an electric heater. The block identified by reference numeral 33 is also intended to represent any alternative heating means. For example, heat could be supplied to the nitrogen gas by conveying an existing source of heat (such as a stream of hot water) to a heat exchanger in proximity with the nitrogen gas stream.

The heated nitrogen is then carried, by conduit 35, to the regenerating bed 23. When the beds are switched, such nitrogen would instead flow to bed 21, as indicated by dotted line 37. The heated nitrogen functions essentially like the steam in the prior art, driving out the trapped toluene from the sites in the bed being regenerated.

The fluid exiting the bed 23, through conduit 39, contains nitrogen, toluene, and a very small amount of water. The water comes partly from the residual water that may be present in the nitrogen gas, and partly from water that has been trapped in the adsorption bed with the toluene. The fluid passes through cooler 41, similar to heat exchanger 7. The nitrogen is recycled, through conduit 43, while conduit 45 carries essentially toluene with traces of water. When the beds are reversed, the conduit 39 is connected instead to bed 21, which becomes the bed being regenerated, the latter connection being shown by a dotted line. The toluene and water are separated in separator 47, if there is any significant water mixed with the toluene.

In general, the system could have a larger number of adsorption beds. For example, there could be a plurality of beds that are active, and an equal number of beds being regenerated. The piping can be easily re-configured to accommodate larger numbers of beds. It is also possible to have a system in which the number of active beds is not equal to the number of beds being regenerated, such as in a case where continuous operation of all the beds is not necessary.

Figure 3:
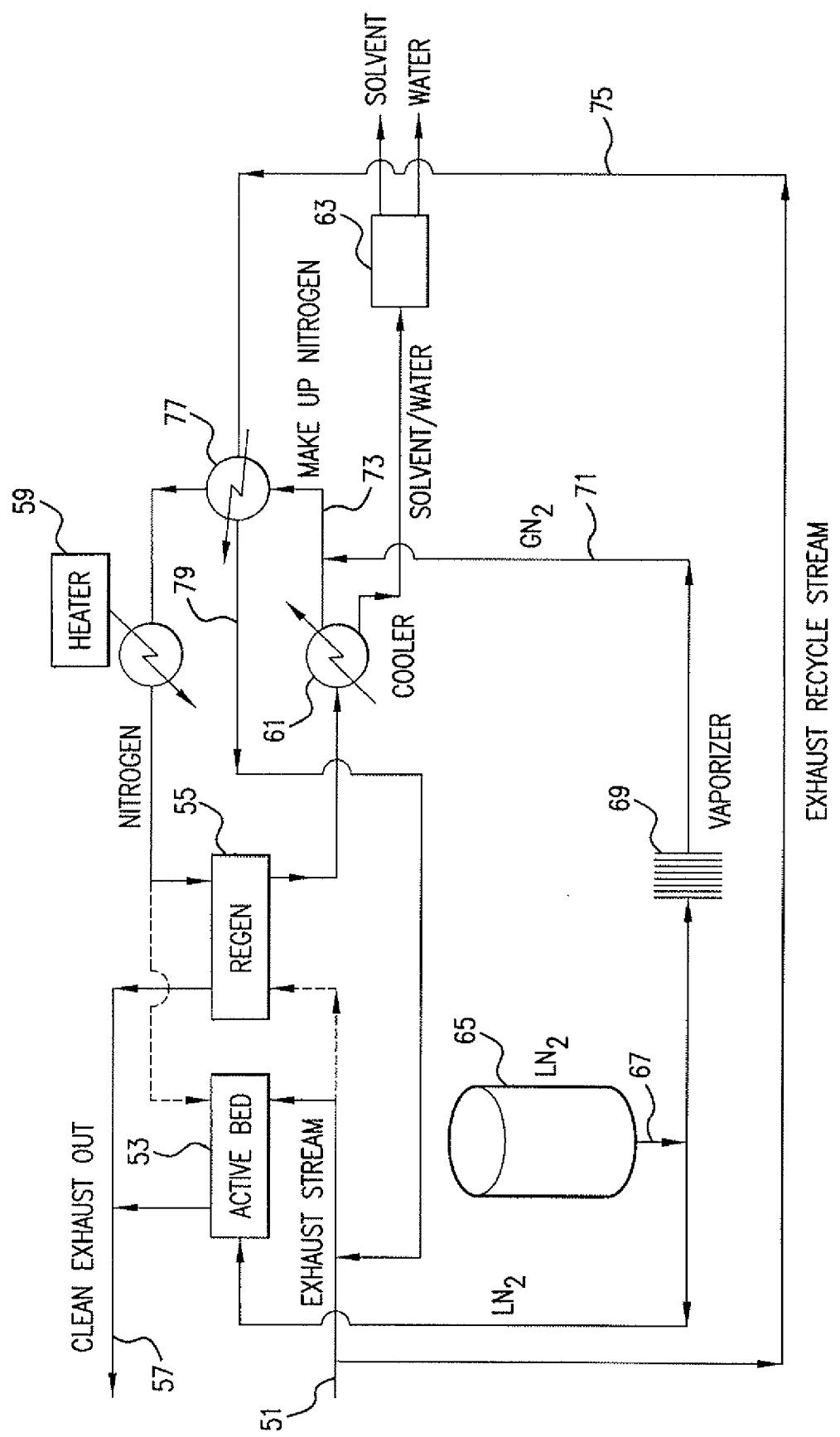
FIG. 3 provides a schematic diagram of a more preferred embodiment of the present invention, in which liquid nitrogen is used both for enhancing the performance of the active adsorption bed, and for replenishing the supply of nitrogen gas used in the regenerating process.

FIG. 3 provides a schematic diagram of the most preferred embodiment of the present invention. As before, the basic input to the system is the exhaust stream coming from a printing process, or other process, in conduit 51. This exhaust stream is cleaned in active bed 53, while bed 55 is being regenerated. Cleaned exhaust gas exits the active bed through conduit 57.

As in the embodiment of FIG. 2, there is a heater 59 which heats nitrogen gas that is directed into the regenerating bed. Heater 59 may be an electric heater. The block identified by reference numeral 59 could instead represent any of the alternative heating means discussed above. Also, the output of the regenerating bed is conveyed to cooler 61, which separates the nitrogen from the solvent and water, so that the solvent and water can be directed to separator 63.

FIG. 3 also shows a tank 65 containing liquid nitrogen. The liquid nitrogen is used for two purposes. First, some of the liquid travels through conduit 67, to the active bed 53. (For simplicity of illustration, a dotted line to the regenerating bed is not shown, but it is understood that a similar conduit would be present, for use when the beds are switched.) The liquid lowers the temperature of the bed, and thereby increases its capacity. By injecting a cool or cold gas into the bed, one increases the amount of toluene that the bed can hold, and increases the time interval between regeneration operations. Although the nitrogen is a liquid when leaving the tank, it can quickly vaporize when it reaches the active bed.

Secondly, the liquid from tank 65 passes through vaporizer 69, from which it emerges as nitrogen gas in conduit 71. This gas comprises the initial supply of nitrogen for regeneration. When the system is in operation, this gas comprises only make-up nitrogen, joining the recirculating flow of nitrogen in conduit 73, leading from cooler 61. Because the system recirculates the nitrogen, very little make-up gas is required, and thus very little additional gas will be drawn from conduit 71.

The system of FIG. 3 also includes conduit 75, which is connected to the incoming exhaust stream to be purified. Some of this stream is diverted through conduit 75, and passes through heat exchanger 77, where at least some heat from the exhaust stream is transferred to the nitrogen used for regeneration. The heat exchanger 77 is upstream relative to heater 59, so the task of heating the nitrogen is completed by heater 59.

Note that heat exchanger 77 is constructed such that the nitrogen stream in conduit 73, and the exhaust stream coming from conduit 75, do not touch each other, but only indirectly transfer heat. The diverted exhaust stream, delivered through conduit 75, returns through conduit 79 to the point from which it was diverted, or to some point in fluid communication therewith. In this way, residual heat present in the exhaust stream coming from the printing process, or other process, is used to pre-heat the nitrogen, thereby reducing the energy burden on the heater 59, and using heat in the exhaust stream that otherwise would be wasted. Moreover, by transferring heat to the nitrogen used for regeneration, the exhaust stream is cooled somewhat, further enhancing the efficiency of operation of the active bed.

The nitrogen used to regenerate the adsorption bed should preferably be heated to about 250° F., or more. In general, the nitrogen must be hot enough to drive the toluene out of the bed, which requires that the temperature be higher than the boiling point of the toluene. Toluene boils at about 231° F. When the fluid stream containing nitrogen and toluene is cooled, the toluene readily becomes liquid, while the nitrogen remains a gas.

The toluene that is recovered in the process of the present invention is essentially free of water. The toluene contains only the trace amount of water that is adsorbed from the exhaust stream in the active bed. Because there is only a trace amount of water, there is virtually no need to provide for treatment of waste water. The toluene recovered by the present invention is relatively pure.

A primary advantage of the present invention is the elimination of the need to make steam for regeneration of adsorption beds. Thus, the expenditure on natural gas, or other fuels, is substantially reduced. While there is still an energy requirement for heating the nitrogen, this requirement is far less than that required for making steam. Also, the nitrogen can be economically heated by different alternative means, including electric heating or other means. As noted above, one could also use sources of heat that already exist in a particular plant, such as by tapping hot water in existing hot water lines.

In general, one can heat the nitrogen by selecting a source of heat that already exists in a facility, or bringing such a source (such as an electric heater) into the facility, and placing the source of heat in heat exchange relationship with the nitrogen used for regeneration.

Another important advantage of the present invention is that it does not require a chemical reaction involving oxygen. Since only nitrogen is conveyed through the bed being regenerated, there is little likelihood of any adverse reactions. By contrast, steam is problematic because organic solvents tend to undergo hydrolysis, i.e. they react with water.

As noted above, the same source that provides nitrogen for use in regenerating one of the beds, can also provide a source of refrigerating gas for operating the active bed. The effectiveness of the bed increases as its temperature decreases. Thus, the nitrogen helps the processes conducted in both the active bed and the regenerating bed.

The present invention also reduces the cost of an exhaust treatment process by recycling of nitrogen. Nitrogen used in regenerating is recycled, and may be circulated through the adsorption bed many times.

The preferred gas for use in the present invention is nitrogen, but any other inert, or relatively inert, gas may be used instead.

The solvent being removed from the gas stream has been identified as toluene, but the invention can be used in the removal of other solvents or other materials as well.

The present invention can therefore be modified in various ways, within the scope of this disclosure. The number of active and regenerating beds can be varied, and different heating means can be used. These and other modifications, which will be apparent to the reader skilled in the art, should be considered within the spirit and scope of the following claims.

What is claimed is:

1. In a method for treatment of an exhaust fluid stream containing a material to be removed, comprising the steps of:
   a) passing an exhaust stream through a first adsorption bed so as to trap a material to be removed, from the stream, in said first adsorption bed,
   b) conveying heated inert gas through a second adsorption bed so as to drive off said material that was trapped in said second adsorption bed,
   c) recovering said material removed from said second adsorption bed,
   d) reversing connections between the exhaust stream and the inert gas, and said first and second beds, such that the exhaust stream passes through said second bed and the inert gas passes through said first bed, and
   e) continuously repeating steps (a) through (d),
   wherein the improvement comprises:
   f) conveying liquefied inert gas to a one of said first and second beds which is currently receiving the exhaust stream,
   g) directing inert gas, taken from a same source as said liquefied inert gas, to a one of said first and second beds which is currently receiving the heated inert gas, and
   h) diverting a portion of the exhaust stream so as to pre-heat the inert gas before the inert gas enters one of said first and second beds, and returning said portion of the exhaust stream to a conduit connected to the one of said first and second beds which is currently receiving the exhaust stream.

2. The improvement of claim 1, wherein the method comprises heating the inert gas with an electric heater.

3. The improvement of claim 1, wherein the inert gas is heated by selecting a heating means and placing said heating means in heat exchange relationship with the inert gas.

4. The improvement of claim 2, wherein the pre-heating is performed before the heating step.

5. In a method for removal of a material from a fluid stream, the method comprising passing the fluid stream through a first adsorption bed while regenerating a second adsorption bed, the regenerating being performed by directing a heated inert gas into the second adsorption bed so as to remove the material, and periodically switching the first and second adsorption beds,
   the improvement wherein the method further comprises diverting a portion of the fluid stream to a heat exchanger which is positioned to transfer heat to inert gas used in the regenerating step, and returning said portion of the fluid stream to a point in fluid communication with the stream from which said portion was diverted.

6. The improvement of claim 5, wherein the inert gas is heated by a heater, and wherein the step of diverting a portion of the fluid stream comprises directing said portion through a heat exchanger that is located upstream of said heater.

7. The improvement of claim 5, wherein the method further comprises directing a liquefied gas into said one of said beds through which the fluid stream is currently being passed.

8. The improvement of claim 7, wherein the inert gas is selected to be nitrogen, and wherein the liquefied gas is selected to be liquid nitrogen, and wherein the inert gas and the liquefied gas are selected to be taken from a common source.

9. The improvement of claim 5, wherein the method comprises heating the inert gas with an electric heater.

10. The improvement of claim 5, wherein the inert gas is heated by selecting a heating means and placing said heating means in heat exchange relationship with the inert gas.

11. A system for removal of a material from a fluid stream, comprising:
   a) a first adsorption bed positioned to receive a fluid stream containing a material to be removed, and means for recovering said material that has been removed from the fluid stream,
   b) a second adsorption bed, positioned to receive an inert gas used to drive off said material trapped in said second adsorption bed, and means for heating the inert gas before it enters the second adsorption bed,
   c) means for periodically reversing said first and second adsorption beds,
   d) means for conveying a liquefied inert gas to a one of said first and second beds which is currently receiving the fluid stream,
   e) means for directing an inert gas, from a same source which supplies said conveying means, to a one of said first and second beds which is currently receiving the heated inert gas, and
   f) means for diverting a portion of the fluid stream so as to pre-heat the inert gas before the inert gas enters one of said first and second beds, and returning said portion of the fluid stream to a conduit connected to the one of said first and second beds which is currently receiving the fluid stream.

12. The system of claim 11, wherein the heating means comprises an electric heater.

13. A system for removal of a material from a fluid stream, comprising:
   a) a first adsorption bed, connected to receive a fluid stream containing a material to be removed, and means for recovering said material,
   b) a second adsorption bed, connected to a source of a heated inert gas, and means for recovering said material driven off from the second adsorption bed by the heated inert gas,
   c) means for periodically reversing the first and second adsorption beds, and
   d) means for diverting a portion of the fluid stream to a heat exchanger which is positioned to transfer heat to said inert gas, and for returning said diverted portion to a point in fluid communication with the stream from which said portion was diverted.

14. The system of claim 13, further comprising means for directing a liquefied gas into said one of said beds through which the fluid stream is currently being passed.

15. The system of claim 14, wherein the liquefied gas and the inert gas are taken from a common source.

16. The system of claim 13, wherein the source of heated inert gas includes an electric heater.

* * * * *